Feb. 23, 1926.
R. R. McGREGOR
1,574,101
FRONT GUARD FOR AUTOMOBILES
Filed May 23, 1925
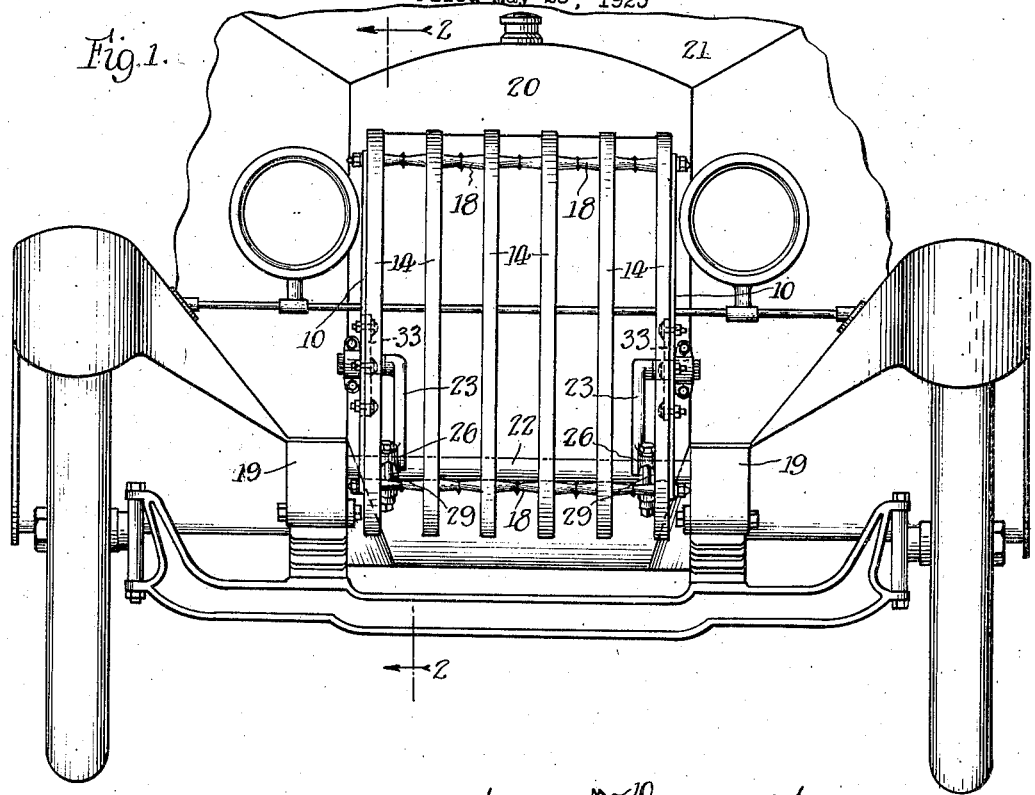
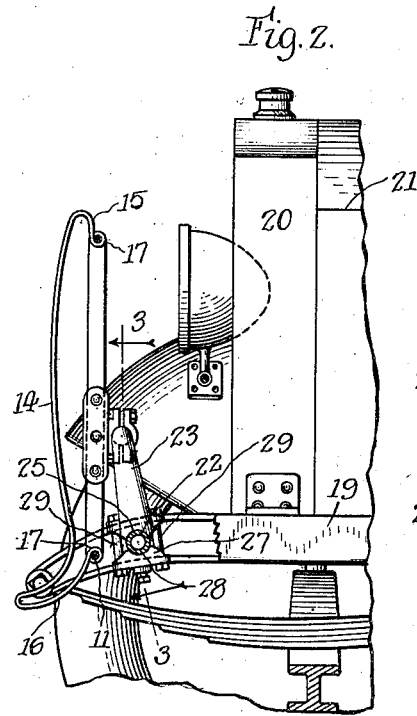
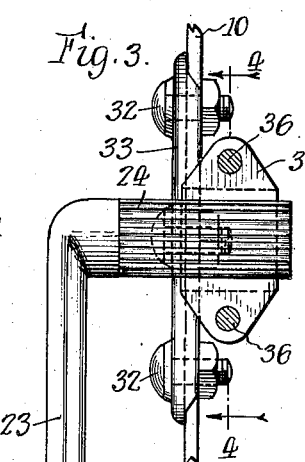
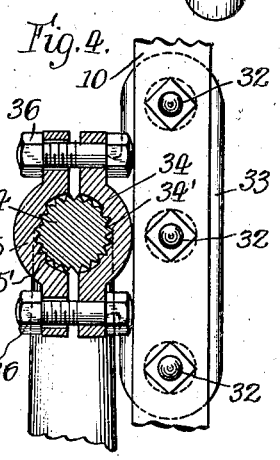
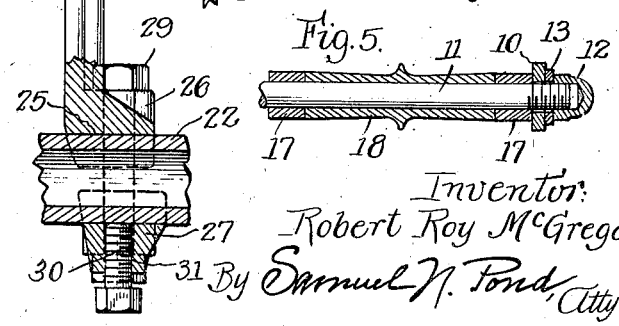
Inventor:
Robert Roy McGregor,
By Samuel N. Pond, Atty.

Patented Feb. 23, 1926.

1,574,101

UNITED STATES PATENT OFFICE.

ROBERT ROY McGREGOR, OF CHICAGO, ILLINOIS.

FRONT GUARD FOR AUTOMOBILES.

Application filed May 23, 1925. Serial No. 32,305.

*To all whom it may concern:*

Be it known that I, ROBERT ROY MCGREGOR, a citizen of the United States, residing at Chicago, in the county of Cook and State of Illinois, have invented certain new and useful Improvements in Front Guards for Automobiles, of which the following is a specification.

This invention relates to protective devices for automobiles and other motor vehicles such as are commonly mounted on the front end of the vehicle frame and are designed to protect the radiator, lamps and other fragile parts from injury in the event of collision with another vehicle or stationary objects.

The device of my present invention has been designed more particularly as a radiator guard or fender adapted for use on automobiles employing a spacing bar or rod between the forward ends of the side frame bars of the chassis frame and forwardly of the front plane of the radiator.

Among the objects of the invention are, to provide improved mounting and attaching means for the fender grid which will permit the latter to be made of a width substantially equal to the full space between the forward ends of the side frame bars of the chassis; to provide improved mounting and attaching means which will permit the fender grid to be adjusted at different distances from the vertical plane of the front of the radiator; to provide a simple and easily applied grid supporting means that may be readily mounted on the forward spacing bar of the chassis frame; and, generally, to provide a very simple, efficient and inexpensive radiator guard or fender, well adapted to fully protect the fragile honey-comb structure of the radiator from injury through collision.

Other objects and attendant advantages of the invention will be apparent to persons skilled in the art from the subjoined description, taken in connection with the accompanying drawing wherein I have illustrated one simple and practical embodiment of the invention, and in which—

Fig. 1 is a front elevation of an automobile equipped with my improved radiator guard or fender;

Fig. 2 is a side elevation, viewed from the right of Fig. 1, and in vertical section through the radiator guard;

Fig. 3 is an enlarged rear elevation of one of the supporting arms of the guard, partly in section on the line 3—3 of Fig. 2;

Fig. 4 is a vertical section through the trunnion on the upper end of the supporting arm and its clamp, taken on the line 4—4 of Fig. 3; and Fig. 5 is an enlarged longitudinal section in the plane of one of the tie-rods of the fender frame, showing one of the spacing spools between adjacent spring fender bars.

The grid structure of the guard or fender is substantially identical with that disclosed in an earlier application filed by me on the 28th day of March, 1925, Serial No. 18,963, and comprises the following parts. 10 designates each of a pair of flat vertical side bars, which are connected at top and bottom by horizontal tie-rods 11 passing therethrough and secured by nuts 12 and washers 13 (Fig. 5). Mounted and supported upon the upper and lower tie-rods 11 are a plurality of uniformly spaced vertically extending spring fender bars 14, preferably taking substantially the form best shown in Fig. 2, wherein it will be seen that the bars are slightly bowed forwardly throughout the greater part of their length and terminate in upper and lower rearwardly bent loop portions 15 and 16, the ends of which are curled around the tie-rods 11, as clearly shown at 17 in Figs. 2 and 5. These spring fender bars are rigidly spaced by means of spacing sleeves 18 mounted on the tie-rods 11 between adjacent fender bars, all as clearly shown in Fig. 5.

19 designates the usual side frame bars of an automobile chassis, and 20 a conventional form of radiator located just in advance of the usual engine hood or bonnet 21. 22 designates a tubular rod that extends between and spaces the forward ends of the frame bars 19 in numerous makes of automobiles. In my present invention, this rod is utilized as a support for the radiator guard or fender through the following described mounting and supporting means.

23 designates each of a pair of reversely facing and mating arms, each of which is formed on its upper end with an integral inwardly extending and longitudinally toothed or serrated trunnion 24, and on its lower end with an approximately semi-circular seat 25 of a curvature to fit the curvature of the spacing rod 22. On either side of the seat 25 are apertured ears or lugs 26. 27 designates a clamp block formed on its upper side with a central seat 28 of a curvature to fit the curvature of the tubular rod 22. The opposite sides of the clamp block 27 are apertured in line with the apertures of the ears or lugs 26 to receive clamp bolts 29, by which the arms 23 are strongly and rigidly clamped on the spacing rod 22. Set screws 30 threaded through central openings 31 (Fig. 3) in the clamp blocks 27 bite into the rod 22 and prevent swinging movement of the arms 23.

Strongly attached to the inner side of each of the vertical side members 10 of the fender grid as by bolts 32 is the channelled base 33 of one member 34 of an internally toothed trunnion grip or clamp, the other member 35 of which is secured thereto by bolts 36. The mating members 34 and 35 of the clamp are formed with internally toothed half bearings 34' and 35' respectively that receive between them the trunnion 24 of the arm 23; the teeth of the clamps and trunnion interfitting, whereby the clamp is securely locked on the trunnion against relative turning movement thereon. However, by backing out the bolts 36 sufficiently to disengage the co-operating teeth of the clamp and the trunnion, the position of the clamp around the trunnion may be shifted.

Through the means last described the fender grid is wholly supported at two points on and from the spacing rod 22. By reason of the fact that the supporting arms 23 lie inwardly of the vertical side members of the fender grid, as clearly shown in Fig. 1, it is possible to make the fender grid wide enough to substantially fill the space between the chassis frame members 19, and thus afford a complete covering and protection for the front of the radiator. This construction also leaves the forwardly projecting ends of the chassis frame bars 19 free and unobstructed for the attachment thereto of the carrying arms of a bumper. If it is desired to adjust the fender frame closer to or farther from the radiator, this may readily be done by loosening the set screws 30 and clamp bolts 29 and swinging the arms 23 to the desired angle, and then adjusting the grid to vertical position by retracting the bolts 36 sufficiently to disengage the co-operating teeth of the trunnion and clamp members and permit them to be set to a new position with the grid frame vertical.

The entire structure is capable of being inexpensively manufactured and mounted on automobiles which are equipped with the front spacing rod or bar 22, and manifestly provides a simple, neat and efficient protector or guard for the entire front of the radiator.

I claim—

1. The combination with the side frame bars of an automobile chassis, and a rod connecting and spacing the forward end portions thereof, of a substantially rectangular automobile fender grid, and a pair of rigid supporting arms attached at their upper ends to the side frame members of said grid and at their lower ends nonrotatably mounted on said rod.

2. The combination with the side frame bars of an automobile chassis, and a rod connecting and spacing the forward end portions thereof, of a substantially rectangular automobile fender grid of a width approximately equal to the distance between said frame bars, and a pair of rigid supporting arms attached at their upper ends to, and disposed inwardly of, the side frame members of said grid and at their lower ends nonrotatably mounted on said rod.

3. The combination with the side frame bars of an automobile chassis, and a rod connecting and spacing the forward end portions thereof, of a substantially rectangular automobile fender grid, a pair of rigid upstanding supporting arms non-rotatably mounted at their lower ends on said rod and formed on their upper ends with laterally extending trunnions, and clamps attaching said grid to said trunnions.

4. The combination with the side frame bars of an automobile chassis, and a rod connecting and spacing the forward end portions thereof, of a substantially rectangular automobile fender grid of a width approximately equal to the distance between said frame bars, a pair of rigid upstanding supporting arms non-rotatably mounted at their lower ends on said rod and formed on their upper ends with outwardly extending trunnions, and clamps attaching the side frame members of said grid to said trunnions.

5. The combination with the side frame bars of an automobile chassis, and a rod connecting and spacing the forward end portions thereof, of a substantially rectangular automobile fender grid of a width approximately equal to the distance between said frame bars, a pair of rigid upstanding supporting arms clamped at their lower ends on said rod by means permitting adjustment of said arms around said rod and formed on their upper ends with outwardly extending longitudinally toothed trunnions, and internally toothed clamps mounted on said trunnions and themselves attached to and supported by the side frame members of said grid.

ROBERT ROY McGREGOR.